(12) United States Patent
Ito et al.

(10) Patent No.: US 8,087,136 B2
(45) Date of Patent: Jan. 3, 2012

(54) METHOD OF PRODUCING AN ELECTRONIC DEVICE

(75) Inventors: Kazushige Ito, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 727 days.

(21) Appl. No.: 11/905,831

(22) Filed: Oct. 4, 2007

(65) Prior Publication Data

US 2008/0110006 A1 May 15, 2008

Related U.S. Application Data

(62) Division of application No. 11/212,885, filed on Aug. 29, 2005, now Pat. No. 7,295,422.

(30) Foreign Application Priority Data

Aug. 31, 2004 (JP) .................................. 2004-252595

(51) Int. Cl.
*H01G 7/00* (2006.01)
(52) U.S. Cl. ..... 29/25.42; 29/25.03; 29/875; 361/321.4; 501/138
(58) Field of Classification Search ............... 29/25.03, 29/25.35, 25.41, 25.42, 830, 831, 846, 874–876; 264/615; 361/303, 311, 320, 321.1, 321.2, 361/321.3, 321.4, 321.5; 423/598; 501/135–138
See application file for complete search history.

(56) References Cited

U.S. PATENT DOCUMENTS

| 2,946,937 | A |   | 7/1960 | Herbert |   |
|---|---|---|---|---|---|
| 3,041,189 | A |   | 6/1962 | Herbert |   |
| 3,987,347 | A |   | 10/1976 | Burn |   |
| 5,097,391 | A | * | 3/1992 | Nomura et al. | 29/25.42 |
| 5,335,139 | A | * | 8/1994 | Nomura et al. | 29/25.42 |
| 5,835,339 | A |   | 11/1998 | Sakamoto et al. |   |
| 7,006,345 | B2 |   | 2/2006 | Nakano et al. |   |
| 2003/0158032 | A1 |   | 8/2003 | Fujikawa et al. |   |
| 2003/0199385 | A1 |   | 10/2003 | Kamiya et al. |   |
| 2005/0286208 | A1 |   | 12/2005 | Ito et al. |   |

FOREIGN PATENT DOCUMENTS

| EP | 1 186 578 A2 | 3/2002 |
| EP | 1 327 616 A2 | 7/2003 |
| JP | A-11-003834 | 1/1999 |
| JP | A-2001-192264 | 7/2001 |
| JP | A-2002-124433 | 4/2002 |
| JP | A-2002-255639 | 9/2002 |
| JP | A-2002-270458 | 9/2002 |
| JP | A-2002-293627 | 10/2002 |
| KR | 2002-0079433 A | 10/2002 |

* cited by examiner

*Primary Examiner* — Donghai D. Nguyen
(74) *Attorney, Agent, or Firm* — Oliff & Berridge, PLC

(57) ABSTRACT

An electronic device having an element body, wherein dielectric layers and internal electrode layers are alternately stacked, wherein a hetero phase is formed in the dielectric layers and/or the internal electrode layers; and the hetero phase includes a Mg element and a Mn element. Preferably, the hetero phase is formed at least at a part near boundaries of the dielectric layers and the internal electrode layers.

3 Claims, 4 Drawing Sheets

(A) DISTRIBUTION OF Mg (B) DISTRIBUTION OF Mn (C) BACKSCATTERED ELECTRON IMAGE (BEI)

METHOD OF PRODUCING AN ELECTRONIC DEVICE

This is a Divisional of application Ser. No. 11/212,885 filed Aug. 29, 2005, now issued as U.S. Pat. No. 7,295,422. The disclosure of the prior application is hereby incorporated by reference herein in its entirety.

BACKGROUND OF THE INVENTION

1. Field of the Invention

The present invention relates to an electronic device, such as a multilayer ceramic capacitor, and the production method, and particularly relates to an electronic device having low IR temperature dependency and a reliable average lifetime, etc. and the production method.

2. Description of the Related Art

A multilayer ceramic capacitor as an electronic device is widely used as a highly reliable compact electronic device having a large capacity, and the number to be used in an electric apparatus is also large. In recent years, as apparatuses becoming more compact with higher performance, demands for a multilayer ceramic capacitor to be more compact, larger in capacity, lower in price, and higher in reliability have increasingly become stronger.

The multilayer ceramic capacitor normally produced by stacking an internal electrode layer paste and a dielectric layer paste by a sheet method or a printing method, etc. and co-firing internal electrode layers and dielectric layers.

As a conductive material of the internal electrode layers, Pd and a Pd alloy are generally used, but due to a high price of Pd, relatively inexpensive base metals, such as Ni and a Ni alloy, have come to be used. When using a base metal as a conductive material of the internal electrode layers, co-firing of the dielectric layers and the internal electrode layers has to be performed in a reducing atmosphere because firing in the air results in oxidization of the internal electrode layers. However, when firing in a reducing atmosphere, the dielectric layers are reduced and the specific resistance is liable to decline. Therefore, a non-reducing dielectric material has been developed.

However, in multi-layer ceramic capacitors using a dielectric ceramic composition, IR (insulation resistance) remarkably deteriorates due to an electric field application, namely, there is a disadvantage that an IR lifetime is short and the reliability is low.

Also, a preferable temperature characteristic of a capacity is also demanded in a capacitor and, particularly, the temperature characteristic of the capacity is demanded to be flat under a strict condition depending on the use object. In recent years, multilayer ceramic capacitors have come to be used in a variety of electronic devices mounted in engine compartments of automobiles, such as an electronic control unit (ECU), a crank angle sensor and an Anti Lock Brake System (ABS) module. Since these electronic devices are for stable engine controlling, drive controlling and brake controlling, preferable temperature stability of the circuit is required.

To overcome the disadvantages, for example, the Japanese Patent Publication No. 3348081 discloses a dielectric ceramic composition, wherein a containing ratio of rare earth oxides is made high comparing with a conventional X7R-characteristic material and a content of an oxide of an element selected from Mg, Ca, Ba, Sr and Cr is 0.1 to 3 moles. According to the invention described in the article, since easily evaporating Pb, Bi and Zn are not included, firing in a reducing atmosphere becomes possible, so that it is possible to obtain a dielectric ceramic composition, wherein a temperature characteristic of the capacity can be improved and the X8R characteristics are satisfied.

Also, the Japanese Patent Publication No. 3341003 discloses a dielectric ceramic composition satisfying the X8R characteristics even if it is made thin by decreasing a content of an oxide of an element selected from Mg, Ca, Ba and Sr comparing with the dielectric ceramic composition of the Japanese Patent Publication No. 3348081. According to the invention described in the article, the X8R characteristics can be obtained without using an expensive lanthanoid among rare earth oxides.

However, although the temperature dependency of the capacity is improved in the inventions described in the above articles, there is a disadvantage that the IR temperature dependency is large and deterioration of resistance (IR) is particularly notable when used under a high temperature and the reliability becomes poor.

SUMMARY OF THE INVENTION

An object of the present invention is to provide a highly reliable electronic device, such as a multilayer ceramic capacitor, having low IR temperature dependency and an excellent average lifetime characteristic and the production method.

To attain the above object, according to the present invention, there is provided an electronic device having an element body, wherein dielectric layers and internal electrode layers are alternately stacked, wherein:

a hetero phase is formed in the dielectric layers and/or the internal electrode layers; and the hetero phase includes a Mg element and a Mn element.

In the present invention, by forming a hetero phase including a Mg element and a Mn element in the dielectric layers and/or the internal electrode layers, deterioration of the IR at a high temperature can be effectively prevented and the IR temperature dependency can be improved. Also, by forming the hetero phase, the average lifetime characteristic can be improved and the reliability can be improved.

The "IR temperature dependency" is an index for accessing how the insulation resistance IR changes due to temperature changes. The IR temperature dependency can be evaluated by calculating a ratio (change rate) that IR at a predetermined temperature (for example, 150° C.) is changed from IR at a reference temperature (for example, the room temperature of 25° C.). It is evaluated that the smaller the change rate of the IR between a plurality of temperatures, the more superior the IR temperature dependency is; while, the larger, the poorer the IR temperature dependency is. For example, even if a temperature characteristic of the capacitance is satisfied, when the IR temperature dependency is poor particularly under a high temperature, the practical use becomes difficult as a product.

In the present invention, when assuming that the room temperature (25° C.) and a high temperature part (150° C.) are used as examples of the plurality of temperatures and insulation resistance at the respective temperatures are $IR_{25}$ and $IR_{150}$, the IR temperature dependency is evaluated to be good or bad by calculating values of "a loss of significant digits of IR" expressed by the formula (I) below. In the "loss of significant digits of IR", the larger the value is (the smaller the absolute value is), the lower the IR temperature dependency is. In the present invention, the "loss of significant digits of IR" expressed by the formula below can be made −2.00 or more.

$$\log(IR_{150}/IR_{25}) \qquad (1)$$

In the present invention, preferably, the hetero phase is formed at least at a part near boundaries of the dielectric layers and the internal electrode layers.

By forming the hetero phase near boundaries of dielectric layers and internal electrode layers, the IR temperature dependency can be more effectively reduced. Note that in the present invention, it is preferable when the hetero phase is formed substantially near boundaries of the dielectric layers and internal electrode layers and, for example, it may be formed in the dielectric layers or in the internal electrode layers.

In the present invention, preferably, the internal electrode layers include a Ni element as a main component. The Ni element may be included, for example, in a form of a Ni alloy, and alloys of one or more kind of element selected from Mn, Cr and Co with Ni may be mentioned as the Ni alloy. As a result that the Ni element is included in the internal electrode layers, formation of the hetero phase becomes easy.

In the present invention, preferably, the internal electrode layers include a cation element, wherein an effective ionic radius at the time of 6 coordination is in a range of 0.065 to 0.085 nm, by more than 0 wt % and 2.4 wt % or less with respect to the entire internal electrode layers. As the cation element, elements of I (0.067 nm), Ge (0.067 nm), Al (0.0675 nm), Cu (0.068 nm), Fe (0.069 nm), Ni (0.070 nm), Au (0.071 nm), As (0.072 nm), Cr (0.0755 nm), Ga (0.076 nm), At (0.076 nm), Os (0.077 nm), Nb (0.078 nm), Ta (0.078 nm)m Co (0.079 nm), Rh (0.080 nm), Ir (0.082 nm), Ru (0.082 nm) and Sn (0.083 nm) may be mentioned, and an Al element is particularly preferable among them. Note that numbers in brackets indicates an effective ionic radius at the time of 6 coordination. Also, an ionic radius described in the present specification is a value based on the article "R. D. Shannon, Acta Crystallogr., A32, 751 (1976)".

In the present invention, preferably, the internal electrode layers include a Mg element and/or a Mn element.

In the present invention, preferably, the hetero phase furthermore includes a Ni element.

In the present invention, preferably, the hetero phase has a predetermined thickness, and the thickness is preferably 1 μm or thinner, and more preferably 0.5 μm or thinner.

In the present invention, the dielectric layer is preferably composed of a dielectric material, such as calcium titanate, strontium titanate, and barium titanate. Also, the dielectric layer may include a Mg element and a Mn element or a cation element, wherein an effective ionic radius at the time of 6 coordination is in a range of 0.065 to 0.085 nm.

In the present invention, preferably, a ratio (t1/t2) of a thickness (t1) of the dielectric layer and a thickness (t2) of the internal electrode layer satisfies $1 \leq t1/t2 \leq 8$. When $t1/t2 < 1$, that is, when a thickness (t1) of the dielectric layer is too thin, short-circuiting defective rate tends to become high. Also, when $t1/t2 > 8$, that is, when the thickness (t1) of the dielectric layer is too thick, the hetero phase is hard to be formed and it is liable that an effect of improving the IR temperature dependency cannot be obtained.

According to the present invention, there is provided a production method of an electronic device having an element body, wherein dielectric layers and internal electrode layers are alternately stacked, including the step of:

forming pre-fired internal electrode layers for composing the internal electrode layers after firing by using an internal electrode paste;

wherein the internal electrode paste includes a Ni element and a cation element, wherein an effective ionic radius at the time of 6 coordination is in a range of 0.065 to 0.085 nm.

In the production method in the present invention, preferably, the cation element is an Al element.

In the production method of the present invention, preferably, the production method of the present invention furthermore includes the step of forming green sheets for composing the dielectric layers after firing by using a green sheet paste;

wherein the green sheet paste includes a Mg element and a Mn element.

In the production method of the present invention, preferably, the production method of an electronic device of the present invention includes the steps of:

forming a green chip by alternately stacking the green sheets and the pre-fired internal electrode layers;

firing the green chip to obtain a sintered body; and annealing the sintered body;

wherein an annealing temperature in the step of annealing is higher than 800° C. but not higher than 1300° C.

Alternately, according to the present invention, there is provided a production method of an electronic device having an element body, wherein dielectric layers and internal electrode layers are alternately stacked, including the step of:

forming pre-fired internal electrode layers for composing the internal electrode layers after firing by using an internal electrode paste;

forming green sheets for composing the dielectric layers after firing by using a green sheet paste;

forming a green chip by alternately stacking the green sheets and the pre-fired internal electrode layers;

firing the green chip to obtain a sintered body; and annealing the sintered body;

wherein:

the green sheet paste includes a Mg element and a Mn element; and an annealing temperature is 1200 to 1300° C. in the step of annealing.

In the production method of the present invention, preferably, the internal electrode paste includes a Mg element and/or a Mn element.

In the production method of the present invention, preferably, a hetero phase including a Mg element and a Mn element is formed in the dielectric layers and/or the internal electrode layers.

In the production method of the present invention, preferably, the hetero phase is formed at least at a part near boundaries of the dielectric layers and the internal electrode layers.

In the production method of the present invention, preferably, a ratio (t1/t2) of a thickness (t1) of the dielectric layer and a thickness (t2) of the internal electrode layer satisfies $1 \leq t1/t2 \leq 8$.

An electronic device according to the present invention is not particularly limited, and a multilayer ceramic capacitor, piezoelectric device, chip inductor, chip varistor, chip thermistor, chip resistor, and other surface mounted chip electronic devices (SMD) may be mentioned.

According to the present invention, by forming a hetero phase including a Mg element and Mn element in dielectric layers and/or internal electrode layers in an electronic device, such as a multilayer ceramic capacitor, it is possible to provide a highly reliable multilayer ceramic capacitor and other electronic device having low IR temperature dependency and excellent average lifetime characteristic.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Multilayer Ceramic Capacitor 1

Figure 1:
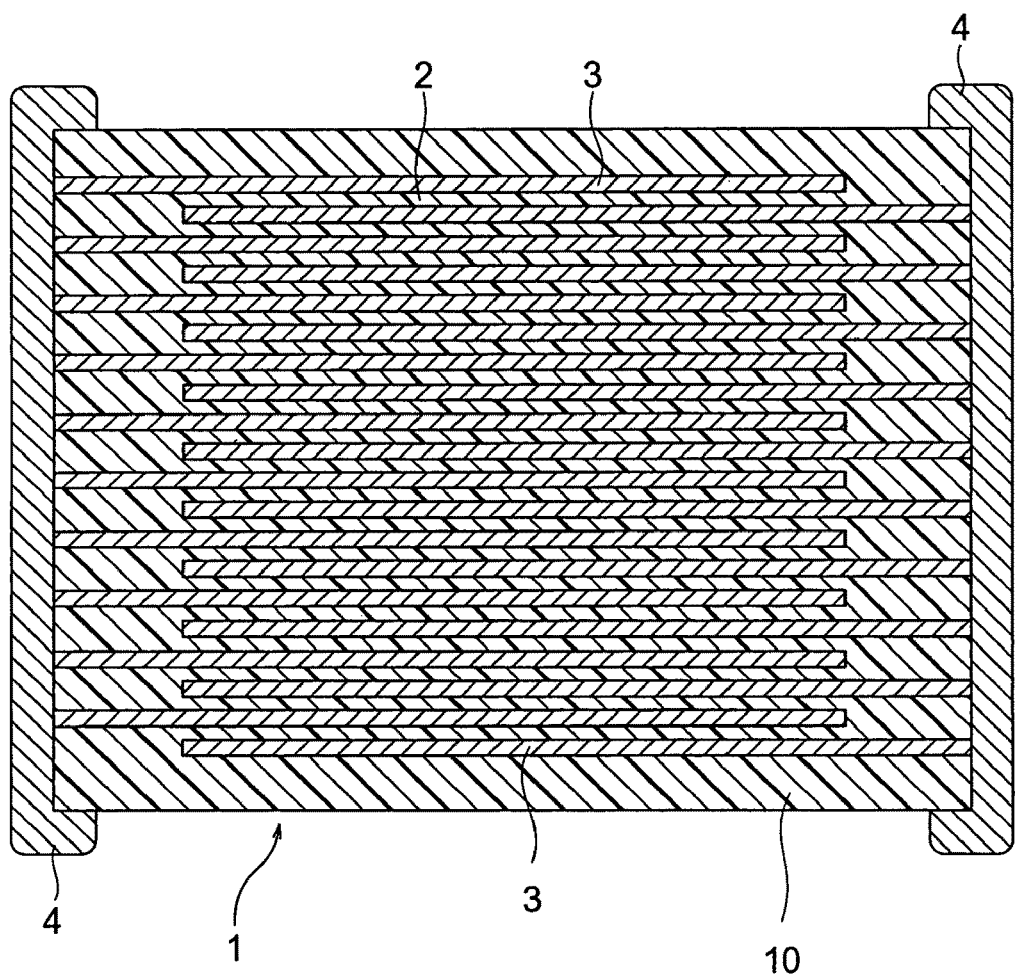
FIG. 1 is a sectional view of a multilayer ceramic capacitor according to an embodiment of the present invention.

As shown in FIG. 1, a multilayer ceramic capacitor 1 according to an embodiment of the present invention comprises a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. A shape of the capacitor element body 10 is not particularly limited, but is normally rectangular parallelepiped. Also, the size is not particularly limited and may be a suitable size in accordance with the use object.

The internal electrode layers 3 are stacked, so that the respective end surfaces are exposed alternately to surfaces of two facing end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

Dielectric Layer 2

The dielectric layers 2 are composed of a dielectric ceramic composition.

A material for composing the dielectric ceramic composition is not particularly limited and a dielectric material, such as calcium titanate, strontium titanate and barium titanate, may be used. Particularly, barium titanate (preferably, expressed by a composition formula $Ba_m TiO_{2+m}$, wherein "m" satisfies $0.995 \leq m \leq 1.010$ and a ratio of Ba and Ti satisfies $0.995 \leq Ba/Ti \leq 1.010$) may be preferably used among these dielectric materials. Also, the dielectric layers 2 may include a variety of additive subcomponents.

Internal Electrode Layer 3

A conductive material included in the internal electrode layers 3 is not particularly limited, but it is preferable to use Ni or a Ni alloy, which is relatively inexpensive base metal. By forming the internal electrode layers 3 by Ni or a Ni alloy, formation of a later explained hetero phase 5 can be accelerated. As the Ni alloy, an alloy of one or more kinds of elements selected from Mn, Cr and Co with Ni is preferable, and a content of Ni in the alloy is preferably 95 wt % or more. Note that the Ni or Ni alloy may contain various trace components, such as P, by not more than 0.1 wt % or so. A thickness of the internal electrode layer 3 may be suitably determined in accordance with the use object, etc., but normally it is preferably 0.1 to 3 μm, and particularly 0.2 to 2.0 μm or so.

In the present embodiment, the internal electrode layer 3 includes a cation element, wherein an effective ionic radius at the time of 6 coordination is in a range of 0.065 to 0.085 nm, preferably by more than 0 wt % and 2.4 wt % or less, and more preferably 0.1 wt % or more and 2.0 wt % or less with respect to the entire internal electrode layer. As the cation element, elements of I, Ge, Al, Cu, Fe, Ni, Au, As, Cr, Ga, At, Os, Nb, Ta, Co, Rh, Ir, Ru and Sn may be mentioned, and an Al element is particularly preferable among them.

Hetero Phase 5

Figure 2:
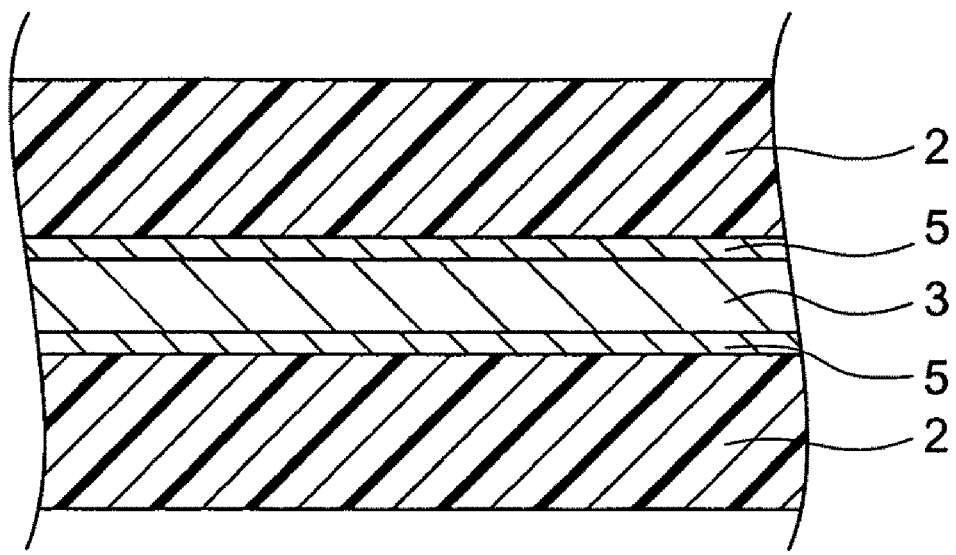
FIG. 2 is a sectional view of a key part of a multilayer ceramic capacitor according to an embodiment of the present invention.

In the present embodiment, a hetero phase 5 as a segregation phase including at least a Mg element and a Mn element and having a different composition ratio from those of the dielectric layer 2 and the internal electrode layer 3 is formed in the dielectric layer 2 and/or the internal electrode layer 3. It is sufficient if the hetero phase 5 is formed in any one of the dielectric layer 2 or the internal electrode layer 3 but, as shown in FIG. 2, it is preferable to be formed at least at a part near a boundary of the dielectric layer 2 and the internal electrode layer 3.

By forming the hetero phase 5 including a Mg element and Mn element in the dielectric layer 2 or the internal electrode layer 3, a decline of the IR at a high temperature can be effectively prevented and IR temperature dependency can be reduced. Particularly, by forming the hetero phase 5 at least at a part near a boundary of the dielectric layer 2 and the internal electrode layer 3, an effect of improving the IR temperature dependency can be enhanced.

A content of a Mg element in the hetero phase 5 is preferably 10 to 50 wt % or so with respect to the entire hetero phase 5. Similarly, a content of a Mn element is preferably 0.1 to 50 wt % or so with respect to the entire hetero phase 5. When the content of a Mg element is too small, it is liable that an effect of reducing IR temperature dependency is hard to be obtained. Note that the Mg element and Mn element exist as oxides in the hetero phase 5.

A shape and size of the hetero phase 5 are not particularly limited, but it is preferable that the hetero phase 5 has a predetermined thickness, which is preferably 1 μm or thinner, and more preferably 0.5 μm or thinner. When the thickness is too thick, a paraelectric layer portion increases and the permittivity tends to decline.

In the present embodiment, a ratio (t1/t2) of a thickness (t1) of the dielectric layer 2 and a thickness (t2) of the internal electrode layer 3 is preferably $1 \leq t1/t2 \leq 8$, and more preferably $2 \leq t1/t2 \leq 6$. When t1/t2<1, that is, when a thickness (t1) of the dielectric layer 2 is too thin, a distance between adjacent internal electrode layers 3 becomes too short and the short-circuiting defective rate tends to increase. On the other hand, when t1/t2>8, that is, when the thickness (t1) of the dielectric layer 2 is too thick, formation of the hetero phase 5 becomes difficult and it is liable that an effect of improving the IR temperature dependency cannot be obtained. Note that thicknesses of the dielectric layer 2 and the internal electrode layer 3 are not particularly limited but the thickness (t1) of the dielectric layer 2 is normally 3 to 7 μm or so, and the thickness (t2) of the internal electrode layer 3 is normally 0.5 to 2 μm or so.

External Electrode 4

A conductive material included in the external electrode 4 is not particularly limited, but inexpensive Ni, Cu and alloys of these may be used in the present invention. A thickness of the external electrode 4 may be suitably determined in accordance with the use object, etc., but normally 10 to 50 µm or so is preferable.

Production Method of Multilayer Ceramic Capacitor

A multilayer ceramic capacitor in the present embodiment is produced by preparing a green chip by a normal printing method and sheet method using a paste, firing the same, then, printing or transferring external electrodes and firing in the same way as in a multilayer ceramic capacitor of the related art. Below, the production method will be explained specifically.

First, dielectric ceramic composition powder included in a green sheet paste is prepared and made to be slurry to fabricate a green sheet paste.

The green sheet paste may be organic slurry obtained by kneading the dielectric ceramic composition powder with an organic vehicle or water based slurry.

As the dielectric ceramic composition powder, the above oxides, mixtures thereof, and composite oxides may be used, and also it may be suitably selected from a variety of compounds to be the above oxides, mixtures thereof, and compounds to be oxides or composite oxides by firing, such as carbonate, oxalate, nitrate, hydroxide and organic metal compound, etc., and mixed for use. A content of each compound in the dielectric ceramic composition powder may be determined, so that a composition of the above dielectric ceramic composition after firing is obtained. In a state before being made to be slurry, a particle diameter of the dielectric ceramic composition powder is normally 0.1 to 1 µm or so as the average particle diameter.

In the present embodiment, it is preferable that the green sheet paste furthermore includes a Mg element and Mn element for forming the hetero phase 5. Adding quantities of the Mg element and Mn element are not particularly limited and may be suitably adjusted in accordance with a ratio of the dielectric layer 2 and the hetero phase 5 after firing. The Mg element and Mn element may be added as oxides or powder of a variety of compounds to be oxides or composite oxides by being fired.

The organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as a printing method and sheet method.

Also, when using a water based paste as a green sheet paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by Ni or a Ni alloy or a variety of oxides, organic metal compounds, and resinates, etc., which become Ni or a Ni alloy after firing, with the above organic vehicle.

The internal electrode paste furthermore includes a cation element, wherein an effective ionic radius at the time of 6 coordination is in a range of 0.065 to 0.085 nm. As the cation element, elements of I, Ge, Al, Cu, Fe, Ni, Au, As, Cr, Ga, At, Os, Nb, Ta, Co, Rh, Ir, Ru and Sn may be mentioned and an Al element is particularly preferable among them. An adding quantity of the cation element is preferably more than 0 wt % and 2.4 wt % or less with respect to Ni and a Ni alloy as a conductive material.

In the present embodiment, as a result that a cation element, wherein an effective ionic radius at the time of 6 coordination is in a range of 0.065 to 0.085 nm, is included in the internal electrode paste, and internal electrode layers before firing are formed and fired, formation of the hetero phase 5, particularly, formation of the hetero phase 5 near boundaries of the dielectric layers 2 and the internal electrode layers 3 can be accelerated, a reduction of the IR at a high temperature can be effectively prevented, and a reduction of the IR temperature dependency becomes possible.

A reason thereof is not entirely clear, but the reason below can be considered.

Namely, it is considered that the cation element included in the internal electrode layers before firing gives an effect of accelerating formation of the hetero phase 5, furthermore, this kind of elements move close to boundaries of the dielectric layers 2 and the internal electrode layers 3 by annealing and accelerate formation of the hetero phase 5 near the boundaries.

Note that a cation element, wherein an effective ionic radius at the time of 6 coordination is in a range of 0.065 to 0.085 nm, is liable to move close to the boundaries of the dielectric layers 2 and the internal electrode layers 3 by annealing, so that the content in the internal electrode layers 3 after firing reduces to $1/10$ to $1/100$ or so comparing with that in the internal electrodes before firing.

Also, the internal electrode paste may furthermore includes a Mg element and Mn element for forming the hetero phase 5. As a result of including these elements in the internal electrode paste, formation of the hetero phase 5 can be accelerated.

Note that the cation element, wherein an effective ionic radius at the time of 6 coordination is in a range of 0.065 to 0.085 nm, and the Mg element and Mn element may be added as powder of oxides or a variety of compounds, which become oxides and composite oxides by firing.

An external electrode paste may be fabricated in the same way as that in the internal electrode paste explained above.

A content of an organic vehicle in the pastes explained above is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using a printing method, the green sheet paste and the internal electrode layer paste are stacked and printed on a substrate, such as PET, cut to be a predetermined shape and removed from the substrate to obtain a green chip.

When using a sheet method, the green sheet paste is used to form a green sheet, the internal electrode layer paste is printed thereon, then, the results are stacked to obtain a green chip.

Before firing, binder removal processing is performed on the green chip. The binder removal processing may be suitably determined in accordance with a kind of a conductive material in the internal electrode layer paste, and when using Ni, a Ni alloy or other base metal as the conductive material, the oxygen partial pressure in the binder removal atmosphere is preferably $10^{-45}$ to $10^5$ Pa. When the oxygen partial pressure is lower than the above range, the binder removal effect declines. While, when the oxygen partial pressure exceeds the above range, the internal electrode layer tends to be oxidized.

As other binder removal conditions, the temperature rising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the firing atmosphere is preferably in the air or a reducing atmosphere, and a preferable atmosphere gas in the reducing atmosphere is, for example, a wet mixed gas of $N_2$ and $H_2$.

An atmosphere at firing the green chip may be suitably determined in accordance with a kind of a conductive material in the internal electrode layer paste, and when using Ni, a Ni alloy or other base metal as the conductive material, the oxygen partial pressure in the firing atmosphere is preferably $10^{-9}$ to $10^{-4}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1100 to 1400° C., and more preferably 1200 to 1300° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and a reduction of the dielectric ceramic composition are easily caused.

As other conditions of the firing, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is a wet mixed gas of $N_2$ and $H_2$.

After the firing in a reducing atmosphere, annealing is performed on the capacitor element body. In the present embodiment, an object of the annealing is to re-oxidize the dielectric layers and form the hetero phase 5.

The holding temperature at the annealing (annealing temperature) is preferably higher than 800° C. but not higher than 1300° C., and more preferably 900° C. or hither but not higher than 1300° C. When the holding temperature is in the above ranges, the hetero phase 5 can be effectively formed and the IR temperature dependency can be improved. When the holding temperature is 800° C. or lower, oxidization of the dielectric layers become insufficient, the IR becomes low, formation of the hetero phase 5 becomes insufficient, and the IR temperature dependency deteriorates. On the other hand, when the holding temperature exceeds 1300° C., not only the internal electrode layers are oxidized to reduce the capacity, but the internal electrode layers react with the dielectric base material, and deterioration of the capacity-temperature characteristics, a decline of the IR and a decline of the IR lifetime are easily caused.

As other annealing conditions, the temperature holding time is preferably 1 to 20 hours and more preferably 2 to 10 hours, and the cooling rate is preferably 50 to 500° C./hour and more preferably 100 to 300° C./hour. Also, an oxygen partial pressure in the annealing atmosphere is preferably $10^{-3}$ Pa or higher, and particularly preferably $10^{-2}$ to 10 Pa. When the oxygen partial pressure is lower than the above range, re-oxidization of the dielectric layers becomes difficult, while when exceeds the above range, the internal electrode layers tend to oxidize. A preferable atmosphere gas of the annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so.

The binder removal processing, firing and annealing may be performed continuously or separately.

End surface polishing, for example, by barrel polishing or sand blast, etc. is performed on the capacitor element body obtained as above, and the external electrode paste is printed or transferred thereon and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surfaces of the external electrodes 4 if necessary.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a cation element, wherein an effective ionic radius at the time of 6 coordination is in a range of 0.065 to 0.085 nm, was included in the internal electrode paste when producing the multilayer ceramic capacitor 1, but this kind of element is not necessarily included. Note that, in this case, the holding temperature (annealing temperature) in the annealing step has to be 1200 to 1300° C. to form the hetero phase 5 effectively.

EXAMPLES

Below, the present invention will be explained based on furthermore detailed examples, but the present invention is not limited to the examples.

Example 1

First, $BaTiO_3$ as a main component, $V_2O_5$, $CaZrO_3$, $Y_2O_3$, $Yb_2O_3$ and $(Ba_{0.6}Ca_{0.4})SiO_3$ as subcomponents were prepared, respectively.

Next, the prepared subcomponents were subjected to wet grinding by a ball mill for 20 hours, preliminary firing at 900° C. for 4 hours in the air, then, wet grinding by a ball mill for 20 hours for disintegrating to obtain subcomponent additives. Then, the main component and the preliminarily fired subcomponent additives were subjected to wet grinding by a ball mill for 19 hours and dried to obtain a dielectric material. Note that blending ratios in the dielectric layer material was as below.

$BaTiO_3$: 100 moles
$V_2O_5$: 0.1 mole
$CaZrO_3$: 1.5 mole
$Y_2O_3$: 2.0 moles
$Yb_2O_3$: 1.5 mole
$(Ba_{0.6}Ca_{0.4})SiO_3$: 3.0 moles Next, by using the obtained dielectric material, 100 parts by weight of the dielectric material, 0.9 mole of MgO, 0.3 mole of MnO (note that contents of MgO and MnO are with respect to 100 moles of $BaTiO_3$), 5.0 parts by weight of an acrylic resin, 2.5 parts by weight of benzyl butyl phthalate, 6.5 parts by weight of mineral spirit, 4.0 parts by weight of acetone, 20.5 parts by weight of toluene and 41.5 parts by weight of methylethyl ketone were mixed by a ball mill to be a paste, so that a green sheet paste was obtained.

Next, 44.6 parts by weight of Ni particles, 1.5 parts by weight of $Al_2O_3$ as a co-material, 52 parts by weight of terpineol, 1.5 parts by weight of ethyl cellulose and 0.4 part by weight of benzotriazole were kneaded by triple rolls to be slurry, so that an internal electrode paste was obtained. $Al_2O_3$ as a co-material was added to be 2.5 wt % with respect to the Ni particles. Note that, in the present example, as explained later, $Al_2O_3$ included in the internal electrode paste is diffused near boundaries of dielectric layers and internal electrode layers during firing. Consequently, a content of $Al_2O_3$ to be actually included in the internal electrode layer after firing becomes less than that included in the internal electrode paste.

By using these pastes, a multilayer ceramic capacitor 1 shown in FIG. 1 was produced as explained below.

First, by using the obtained green sheet paste, a green sheet was formed on a PET film. After printing the internal electrode paste thereon, the sheet was removed from the PET film. Next, the green sheets and protective green sheets (not printed with the internal electrode paste) were stacked and bonded with pressure to obtain a green chip.

Note that, in the present example, thicknesses of the green sheet and internal electrode layer before firing were respectively changed, so that a ratio (t1/t2) of a thickness (t1) of a dielectric layer 2 and a thickness (t2) of an internal electrode layer 3 after firing became t1/t2=0.1 to 9 (refer to Table 1 and Table 2).

Next, the green chip was cut to be a predetermined size, and binder removal processing, firing and annealing were performed under conditions below, so that a multilayer ceramic fired body was obtained.

The binder removal processing condition was the temperature raising rate of 30° C./hour, the holding temperature of 260° C., the temperature holding time of 8 hours, and the atmosphere of in the air. The firing condition was the temperature raising rate of 200° C./hour, the holding temperature of 1245° C., the temperature holding time of 2 hours, cooling rate of 300° C./hour and the atmosphere of wet mixed gas of $N_2+H_2$ (the oxygen partial pressure was $10^{-2}$ Pa).

The annealing was performed under annealing temperatures (800 to 1300° C.) shown in Table 1 and Table 2. Other annealing condition was the temperature raising rate of 200° C./hour, the temperature holding time of 2 hours, the cooling rate of 300° C./hour and the atmosphere of wet $N_2$ gas (the oxygen partial pressure was $10^{-1}$ Pa). Note that a wetter, wherein the water temperature was 5 to 75° C., was used to wet the atmosphere gas at the time of firing and annealing.

Next, after polishing end surfaces of the obtained multilayer ceramic fired body by sand-blast, In—Ga was applied as an external electrode, so that samples of a multilayer ceramic capacitor shown in FIG. 1 were obtained. In the present example, as shown in Table 1 and Table 2, samples, wherein a ratio (t1/t2) of a thickness (t1) of a dielectric layer 2 and a thickness (t2) of an internal electrode layer 3 satisfies t1/t2=0.1 to 9 and annealing temperatures are 800 to 1300° C., were obtained.

A size of obtained capacitor samples was 3.2 mm×1.6 mm×0.6 mm, the number of dielectric layers sandwiched by internal electrode layers was 4, a thickness (t1) of a dielectric layer was 1 to 9 μm, and a thickness (t2) of an internal electrode layer was 1 μm or 10 μm.

Note that a measuring method of the dielectric layer thickness was to cut the obtained capacitor sample on a surface vertical with respect to an internal electrode and to take a SEM picture of the cut surface. Then, a vertical line with respect to the internal electrode was drawn on the SEM picture and a distance from the internal electrode to an adjacent internal electrode facing thereto was measured. The measurement was performed for 20 times, an average of the measurement values was obtained, and the average value was considered as the dielectric layer thickness.

On each of the obtained capacitor samples, existence of a hetero phase was confirmed by an EPMA analysis and measurement of a backscattered electron image (BEI), and IR temperature dependency (loss of significant digits) was evaluated. Also, an average lifetime was measured on specific samples.

EPMA Analysis and Measurement of Backscattered Electron Image (BEI).

On each of the capacitor samples, an EPMA analysis and measurement of a backscattered electron image (BEI) by a SEM were made.

Figure 3:
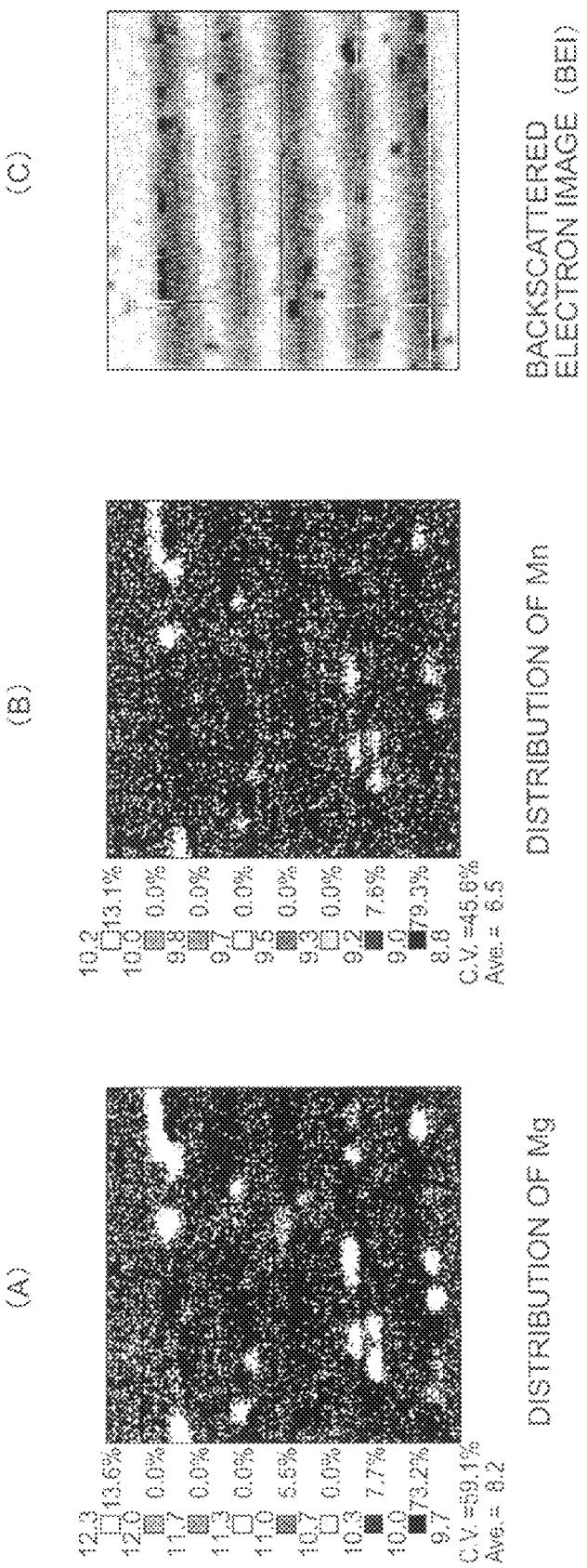
FIG. 3A is a picture showing an element mapping result of a Mg element in dielectric layers and internal electrode layers.
FIG. 3B is a picture showing an element mapping result of a Mn element in dielectric layers and internal electrode layers.
FIG. 3C is a picture showing a backscattered electron image of dielectric layers and internal electrode layers according to an example of the present invention.
Figure 4:
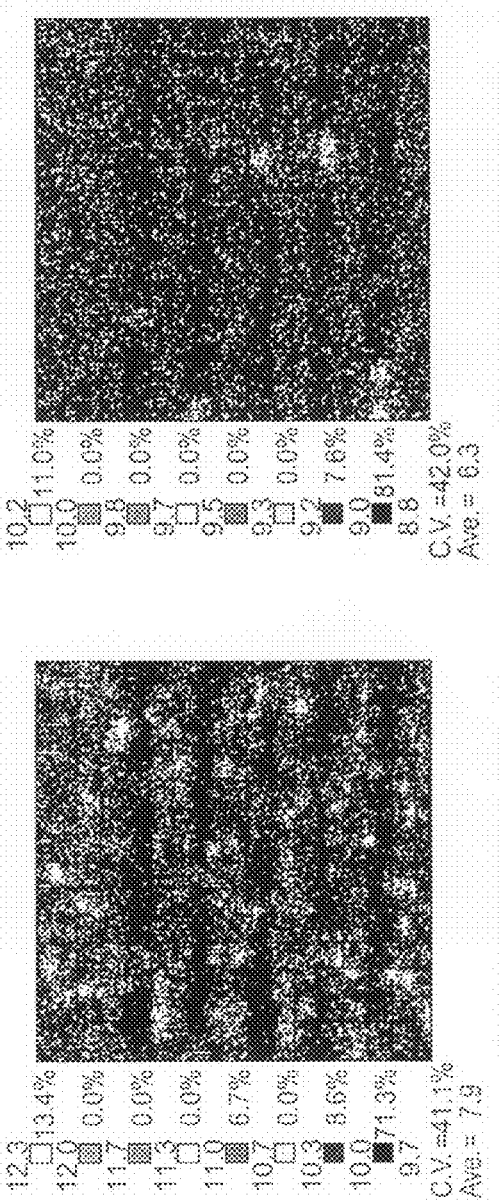
FIG. 4A is a picture showing an element mapping result of a Mg element of in dielectric layers and internal electrode layers.
FIG. 4B is a picture showing an element mapping result of a Mn element in dielectric layers and internal electrode layers.
FIG. 4C is a picture showing a backscattered electron image of dielectric layers and internal electrode layers according to a comparative example of the present invention.

In the EPMA analysis, a cut surface of dielectric layers and internal electrode layers of each sample was subjected to EPMA measurement, and element mapping of the Mg element and Mn element was performed. The measurement was made on a range of a scope of 30 μm×30 μm. Then, existence of a hetero phase including the Mg element and Mn element was confirmed from pictures obtained by the element mapping. Existence of a hetero phase in each sample is shown in Table 1. Also, pictures obtained by the element mapping are shown in FIG. 3A, FIG. 3B, FIG. 4A and FIG. 4B. Note that FIG. 3A and FIG. 3B are pictures of samples (samples of examples of the present invention), wherein t1/t2=3 and an annealing temperature is 1300° C., and FIG. 4A and FIG. 4B are pictures of samples (samples of comparative examples of the present invention), wherein t1/t2=3 and an annealing temperature is 800° C.

Measurement of a backscattered electron image (BEI) was made by taking a SEM picture of a cut surface of the dielectric layers and internal electrode layers of each sample by using a scanning electron microscope (SEM: production number JSM-T300 made by JEOL Ltd.). The measurement was made on the same scope as that in the EPMA analysis. Pictures obtained by the measurement are shown in FIG. 3C and FIG. 4C. Note that FIG. 3C was a picture of a sample (a sample of an example of the present invention), wherein t1/t2=3 and an annealing temperature was 1300° C., and FIG. 4C was a picture of a sample (a sample of a comparative example of the present invention), wherein t1/t2=3 and an annealing temperature was 800° C.

IR Temperature Dependency (Loss of Significant Digits)

First, on each capacitor sample, insulation resistance $IR_{25}$ at 25° C. and insulation resistance $IR_{150}$ at 150° C. were measured, respectively. Measurement of insulation resistance (the unit is Q) was made after applying a DC 7V/μm for 60 seconds at 25° C. and 150° C. by using an insulation-resistance tester (R8340A made by Advantest Corporation). Next, a loss of significant digits expressed by the formula (I) below was calculated from the insulation resistance values $IR_{150}$ and $IR_{25}$. In the present example, −2.00 or larger were considered preferable. The results are shown in Table 2.

$$\log(IR_{150}/IR_{25}) \quad (1)$$

Measurement of Average Lifetime

An average lifetime was measured respectively on capacitor samples, wherein t1/t2=3 and an annealing temperature was 800° C., 1000° C. and 1300° C., and capacitor samples, wherein t1/t2=8 and an annealing temperature was 1300° C., kept to be a state of being applied with a direct current voltage of 10 V/μm at 200° C. The measurement was made on 10 capacitor samples, and an evaluation was made by obtaining an average lifetime. In the present example, time from start ing the application until the insulation resistance reduces by one digit was defined as a lifetime. The longer the lifetime is, the more preferable. In the present example, 10 hours or longer was considered preferable. The results are shown in Table 3.

On the other hand, in samples with an annealing temperature of 800° C., it is confirmed that a hetero phase including a Mg element and Mn element is not formed as shown in FIG. 4A to FIG. 4C, being different from the samples with an annealing temperature of 1300° C. Note that, also in FIG. 4A

TABLE 1

| Dielectric Layer Thickness | Internal Electrode Layer Thickness | Thickness Ratio | Existence of Hetero Phase Annealing Temperature | | | | | |
|---|---|---|---|---|---|---|---|---|
| (t1) [μm] | (t2) [μm] | (t1/t2) | 800° C. | 900° C. | 1000° C. | 1100° C. | 1200° C. | 1300° C. |
| 9 | 1 | 9 | none | none | none | none | none | none |
| 8 | 1 | 8 | none | presence | presence | presence | presence | presence |
| 7 | 1 | 7 | none | presence | presence | presence | presence | presence |
| 5 | 1 | 5 | none | presence | presence | presence | presence | presence |
| 3 | 1 | 3 | none | presence | presence | presence | presence | presence |
| 1 | 1 | 1 | none | presence | presence | presence | presence | presence |
| 1 | 10 | 0.1 | none | presence | presence | presence | presence | presence |

TABLE 2

| Dielectric Layer Thickness | Internal Electrode Layer Thickness | Thickness Ratio | IR Temperature Dependency Annealing Temperature | | | | | |
|---|---|---|---|---|---|---|---|---|
| (t1) [μm] | (t2) [μm] | (t1/t2) | 800° C. | 900° C. | 1000° C. | 1100° C. | 1200° C. | 1300° C. |
| 9 | 1 | 9 | −2.55 | −2.34 | −2.21 | −2.14 | −2.05 | −2.01 |
| 8 | 1 | 8 | −2.45 | −1.99 | −1.99 | −1.97 | −1.8 | −1.73 |
| 7 | 1 | 7 | −2.34 | −1.96 | −1.95 | −1.92 | −1.76 | −1.71 |
| 5 | 1 | 5 | −2.14 | −1.96 | −1.93 | −1.89 | −1.72 | −1.65 |
| 3 | 1 | 3 | −2.13 | −1.93 | −1.86 | −1.79 | −1.69 | −1.62 |
| 1 | 1 | 1 | −2.01 | −1.86 | −1.78 | −1.71 | −1.54 | −1.49 |
| 1 | 10 | 0.1 | — | — | — | — | — | — |

Note that "—" in Table indicates short-circuiting.

Evaluation 1

Table 1 shows existence of a hetero phase including a Mg element and Mn element in respective samples, wherein a ratio (t1/t2) of a thickness (t1) of a dielectric layer 2 and a thickness (t2) of an internal electrode layer 3 after firing is 0.1 to 9 and an annealing temperature is 800 to 1300° C., and Table 2 shows values of IR temperature dependency (loss of significant digits) of the respective examples.

From Table 1, it was confirmed that a hetero phase including a Mg element and Mn element was formed in the dielectric layers or internal electrode layers in samples, wherein t1/t2=0.1 to 8 and an annealing temperature was 900 to 1300° C.

From the picture (FIG. 3A) showing a result of mapping a Mg element of a sample (sample of an example of the present invention), wherein t1/t2=3 and an annealing temperature is 1300° C., the picture (FIG. 3B) showing a result of mapping a Mn element and the backscattered electron image (FIG. 3C), it is confirmed that a hetero phase including the Mg element and Mn element is formed near boundaries of dielectric layers and internal electrode layers. This tendency was also observed in other samples, wherein a hetero phase including a Mg element and Mn element is formed. Note that FIG. 3A to FIG. 3C are pictures on the same scope, wherein white parts in FIG. 3A and FIG. 3B show segregation of the Mg element and Mn element, respectively, and black parts in FIG. 3C shows Ni electrodes.

to FIG. 4C, white parts in FIG. 4A and FIG. 4B show segregation of the Mg element and Mn element, respectively, and black parts in FIG. 4C shows Ni electrodes.

Also, from Table 2, all of samples, wherein t1/t2=1 to 8 and an annealing temperature was 900 to 1300° C., had a value of IR temperature dependency (loss of significant digits) of −2.00 or larger, and IR temperature dependency was confirmed to be low.

On the other hand, all of samples wherein t1/t2=0.1 had too thin dielectric layers and resulted in short-circuiting defects. While, in samples wherein t1/t2=9, a hetero phase including a Mg element and Mn element is not formed and the value of IR temperature dependency (loss of significant digits) was smaller than −2.00, which was poor.

Furthermore, in samples with an annealing temperature of 800° C., a hetero phase including a Mg element and Mn element is not formed regardless of the t1/t2 value, and the value of the IR temperature dependency (loss of significant digits) was smaller than −2.00, which was poor.

From the above results, it was confirmed that a reduction of IR temperature dependency was possible by forming a hetero phase including a Mg element and Mn element. Furthermore, to form the hetero phase including a Mg element and Mn element, it was confirmed that the ratio (t1/t2) of a thickness (t1) of the dielectric layer 2 and a thickness (t2) of the internal electrode layer 3 was preferably 1 to 8 and an annealing temperature was preferably 900 to 1300° C.

TABLE 3

| Sample No. | | Dielectric Layer Thickness (t1) [μm] | Internal Electrode Layer Thickness (t2) [μm] | Thickness Ratio (t1/t2) | Annealing Temperature [° C.] | IR Temperature Dependency | Average Lifetime [h] | Existence of Hetero Phase | Hetero Phase Forming Rate (%) |
|---|---|---|---|---|---|---|---|---|---|
| 3-1 | Comparative Example | 3 | 1 | 3 | 800 | −2.13 | 5 | none | 0 |
| 3-2 | Example | 3 | 1 | 3 | 1000 | −1.86 | 20 | presense | 10 |
| 3-3 | Example | 3 | 1 | 3 | 1300 | −1.62 | 56 | presense | 17 |
| 3-4 | Example | 8 | 1 | 8 | 1300 | −1.73 | 241 | presense | 25 |

Evaluation 2

Table 3 shows IR temperature dependency, an average lifetime and a formation amount of a hetero phase of each of capacitor samples, wherein t1/t2=3 and annealing temperatures were 800, 1000 and 1300° C., and samples, wherein t1/t2=8 and an annealing temperature was 1300° C. Sample numbers 3-1 to 3-4 were given to the respective samples as shown in Table 3.

Note that the hetero phase forming rate was measured by the method below.

First, each capacitor sample was cut on vertical surfaces with respect to the dielectric layers at three parts. Next, the cut surface was observed by enlarging it by magnification of 5000 times by a scanning electron microscope (SEM) and, from the SEM image, a ratio of a hetero phase (segregation phase) segregating near Ni electrodes was obtained by converting to an area ratio. In the present example, it was assumed that a state where a hetero phase completely covers the Ni electrodes was defined to be the hetero phase forming rate of 100%, and a state where the Ni electrodes are not covered at all was defined to be the hetero phase forming rate of 0%. Namely, it means that the higher the hetero phase forming rate is, the larger the hetero phase amount segregating near the electrodes.

From Table 3, in the sample number 3-2, wherein t1/t2=3 and an annealing temperature was 1000° C., the sample number 3-3, wherein t1/t2=3 and an annealing temperature was 1300° C., and in the sample number 3-4, wherein t1/t2=8 and an annealing temperature was 1300° C., a hetero phase including a Mg element and Mn element was formed and the IR temperature dependency and average lifetime were preferable. Particularly, by comparing the sample number 3-2 with the sample number 3-3, it is confirmed that the IR temperature dependency and the average lifetime can be improved by heightening the annealing temperature. Note that when the annealing temperature exceeds 1300° C., it is liable that the internal electrodes are oxidized, so that the annealing temperature has to be not higher than 1300° C.

Furthermore, by comparing the sample number 3-3 with the sample number 3-4, it is confirmed that the larger the t1/t2 value becomes, the longer the average lifetime tends to be; and the smaller the t1/t2 value becomes, the more the IR temperature dependency tends to improve.

On the other hand, in the sample number 3-1, wherein t1/t2=3 and an annealing temperature was 800° C., a hetero phase including a Mg element and Mn element is not formed, and a value of the IR temperature dependency (loss of significant digits) became smaller than −2.00, which was poor. Furthermore, the sample number 3-1 exhibited an average lifetime of 5 hours, which was poor.

From the above results, it was confirmed that the average lifetime characteristic could be improved by forming a hetero phase including a Mg element and Mn element.

Example 2

Other than using as the internal electrode paste pastes obtained by adding $Al_2O_3$ as a co-material respectively by 0 wt %, 2.5 wt %, 5 wt %, 10 wt % and 20 wt % to Ni particles, samples of the multilayer ceramic capacitor shown in FIG. 1 were produced in the same way as in the example 1. Not that, in the present example, green sheets and internal electrode layers before firing were formed, so that the ratio (t1/t2) of a thickness (t1) of the dielectric layer 2 and a thickness (t2) of the internal electrode layer 3 became 3, and an annealing temperature was 1000° C.

On each of the obtained samples, an EPMA analysis and measurement of a backscattered electron image (BEI) by a SEM were made in the same way as those in the example 1 so as to confirm an existence of a hetero phase including a Mg element and Mn element and to evaluate IR temperature dependency (loss of significant digits). Furthermore, in the present example, a line analysis from an upper end to a lower end of a Ni electrode was made by using a transmission electron microscope to obtain a content of an Al co-material (a residual quantity of the Al co-material) in the internal electrode layer after firing, and an average value thereof was considered as a content of the Al co-material.

TABLE 4

| Sample No. | | Dielectric Layer Thickness (t1) [μm] | Internal Electrode Layer Thickness (t2) [μm] | Thickness Ratio (t1/t2) | Annealing Temperature [° C.] | Al Co-material Adding Quantity [wt %] | Al Co-material Residual Quantity [wt %] | IR Temperature Dependency | Average Lifetime [h] |
|---|---|---|---|---|---|---|---|---|---|
| 4-1 | Example | 3 | 1 | 3 | 1000 | 0 | 0 | −1.96 | 20 |
| 4-2 | Example | 3 | 1 | 3 | 1000 | 2.5 | 0.2 | −1.86 | 21 |
| 4-3 | Example | 3 | 1 | 3 | 1000 | 5 | 0.4 | −1.71 | 23 |
| 4-4 | Example | 3 | 1 | 3 | 1000 | 10 | 1.2 | −1.61 | 26 |
| 4-5 | Example | 3 | 1 | 3 | 1000 | 20 | 2.4 | −1.49 | 31 |

Evaluation 3

Table 4 shows results of an Al co-material adding quantity to the internal electrode paste, an Al co-material residual quantity in the internal electrode after firing, IR temperature dependency and an average lifetime. Table 4 also shows results of measurement on samples not added with the Al co-material. Sample numbers 4-1 to 4-5 were given to the respective samples as shown in Table 4.

From Table 4, when a content of the Al co-material in the internal electrode paste increases, it is confirmed that the IR temperature dependency (loss of significant digits) and the average lifetime tend to improve and, particularly, an effect of improving the IR temperature dependency is enhanced. Note that the reason why the IR temperature dependency and the average lifetime were improved as a result that an Al co-material was included in the internal electrode paste was considered because the Al co-material moved close to boundaries of dielectric layers and internal electrode layers by annealing and formation of a hetero phase including a Mg element and Mn element became easier near the boundaries. Note that the reason why a quantity of the Al co-material remained in the internal electrode layer after firing is reduced comparing with the Al co-material quantity included in the internal electrode paste was considered because the Al co-material moved close to boundaries of the dielectric layers and internal electrode layers.

From the above results, as a result that a cation element, wherein an effective ionic radius at the time of 6 coordination was in a range of 0.065 to 0.085 nm, was included in the internal electrode layers before firing, it was confirmed that a hetero phase including a Mg element and Mn element could be more effectively formed, and the IR temperature dependency and the average lifetime could be improved.

What is claimed is:

1. A production method of an electronic device having an element body, wherein dielectric layers and internal electrode layers are alternately stacked, including the steps of:
    forming pre-fired internal electrode layers for composing said internal electrode layers after firing by using an internal electrode paste;
    forming green sheets for composing said dielectric layers after firing by using a green sheet paste;
    forming a green chip by alternately stacking said green sheets and said pre-fired internal electrode layers;
    firing said green chip to obtain a sintered body; and
    annealing said sintered body;
    wherein said green sheet paste includes a Mg element and a Mn element,
    said internal electrode paste includes a Ni element and $Al_2O_3$ as a co-material, wherein the amount of $Al_2O_3$ is 5-20% by weight per 100% by weight of the Ni element,
    an annealing temperature in said annealing step is higher than 800° C. but not higher than 1300° C.,
    each internal electrode layer includes the Ni element as a major ingredient and an Al element of not less than 0.4% by weight but not higher than 2.4% by weight with respect to the entire internal electrode layer, and
    a hetero phase including a Mg element and a Mn element is formed in said dielectric layers and/or said internal electrode layers.

2. The production method of an electronic device as set forth in claim 1, wherein said hetero phase is formed at least at a part of boundaries of said dielectric layers and said internal electrode layers.

3. The production method of an electronic device as set forth in claim 1, wherein a ratio (t1/t2) of a thickness (t1) of said dielectric layer and a thickness (t2) of said internal electrode layer satisfies $1 \leq t1/t2 \leq 8$.

* * * * *